US012576570B2

(12) United States Patent
Lee et al.

(10) Patent No.: US 12,576,570 B2
(45) Date of Patent: Mar. 17, 2026

(54) SYSTEM AND METHOD FOR MONITORING INJECTION MOLDING PROCESS

(71) Applicant: EMOLDINO Inc., Seoul (KR)

(72) Inventors: Young-Hwa Lee, Seoul (KR); Jun-Han Lee, Bucheon-si (KR)

(73) Assignee: EMOLDINO INC., Seoul (KR)

( * ) Notice: Subject to any disclaimer, the term of this patent is extended or adjusted under 35 U.S.C. 154(b) by 0 days.

(21) Appl. No.: 18/024,814

(22) PCT Filed: Jan. 7, 2022

(86) PCT No.: PCT/KR2022/000272
§ 371 (c)(1),
(2) Date: Mar. 6, 2023

(87) PCT Pub. No.: WO2023/038211
PCT Pub. Date: Mar. 16, 2023

(65) Prior Publication Data
US 2024/0278471 A1      Aug. 22, 2024

(30) Foreign Application Priority Data

Sep. 7, 2021      (KR) ........................ 10-2021-0119282

(51) Int. Cl.
*B29C 45/77* (2006.01)
*B29C 45/78* (2006.01)
*B29C 45/80* (2006.01)

(52) U.S. Cl.
CPC .............. *B29C 45/77* (2013.01); *B29C 45/78* (2013.01); *B29C 45/80* (2013.01);
(Continued)

(58) Field of Classification Search
None
See application file for complete search history.

(56) References Cited

U.S. PATENT DOCUMENTS 6,685,458 B2 * 2/2004 Poynor ................... B29C 45/78
425/170
8,899,955 B2 12/2014 Starkey
(Continued)

FOREIGN PATENT DOCUMENTS

JP        H06046928 U  *  6/1994
JP            2590082 Y2    2/1999
(Continued)

OTHER PUBLICATIONS

English translation of JP-6526545-B2 by EPO (claims and specification). (Year: 2019).*
(Continued)

*Primary Examiner* — Xiao S Zhao
*Assistant Examiner* — Inja Song
(74) *Attorney, Agent, or Firm* — LRK PATENT LAW FIRM

(57) ABSTRACT

The present disclosure relates to a system and method for monitoring an injection molding process which may calculate injection time and packing time by attaching an acceleration sensor to an injection molding mold with bolts and measuring an amplitude change of a vibration signal of a mold during injection molding, detect mold closing and opening signals of the mold using a magnetic hall sensor, and monitor the injection molding process by measuring cycle time and cooling time, thereby simplifying installation and maintenance and reducing installation costs.

11 Claims, 11 Drawing Sheets

(52) U.S. Cl.
CPC ................. *B29C 2945/7604* (2013.01); *B29C 2945/76113* (2013.01); *B29C 2945/76254* (2013.01); *B29C 2945/76387* (2013.01); *B29C 2945/76394* (2013.01); *B29C 2945/76488* (2013.01)

(56) References Cited

U.S. PATENT DOCUMENTS

| | | | | |
|---|---|---|---|---|
| 2008/0111264 | A1* | 5/2008 | Esser | B29C 45/17 425/169 |
| 2012/0277900 | A1* | 11/2012 | Catoen | B29C 45/78 700/202 |
| 2019/0342638 | A1* | 11/2019 | Samkowiak | B21D 22/02 |
| 2020/0290258 | A1* | 9/2020 | Gehring | G05B 19/406 |
| 2021/0263695 | A1* | 8/2021 | Tojyo | B29C 45/76 |

FOREIGN PATENT DOCUMENTS

| | | | | | |
|---|---|---|---|---|---|
| JP | 2015-139965 | A | | 8/2015 | |
| JP | 6526545 | B2 | * | 6/2019 | ............ B29C 45/76 |
| JP | 2020-142431 | A | | 9/2020 | |
| KR | 10-1183283 | B1 | | 9/2012 | |
| KR | 10-2266747 | B1 | | 6/2021 | |

OTHER PUBLICATIONS

English translation of JP-H06046928-U by EPO (claims and specification) (Year: 1994).*

Written Opinion of the International Search Authority of PCT/KR2022/000272 mailed on Nov. 30, 2022. (Year: 2022).*

Jun-Han Lee et al., "A study on monitoring for process time and process properties by measuring vibration signals transmitted to the mold during injection molding", Journal of the Korea Society of Die & Mold Engineering, 2020, vol. 14, No. 3, pp. 8-16.

* cited by examiner

FIG. 3

| Specification | Value | Unit |
|---|---|---|
| Interface | I2C interface | |
| Mesurement range | Min. ±2, Max. ±16 | G |
| Resolution | Min. 16384, Max. 2048 | LSB/(degree/s) |
| Update rate | 4 ~ 1,000 | hz |

FIG. 6

| Specification | Value | Unit |
|---|---|---|
| Interface | Digital | |
| Measurement range | -55 ~ +125 | ℃ |
| Measurement precision | 0.5 | ℃ |
| Operation voltage | 3.3 ~ 5 | V |

FIG. 7

| Specification | Value | Unit |
|---|---|---|
| Microcontroller | ATmega328 | - |
| Flash memory | 32 KB of which 2 KB used by bootloader | |
| SRAM | 2 | KB |
| Clock Speed | 16 | MHz |

FIG. 10

| Conditions | Value | | | | | Unit |
|---|---|---|---|---|---|---|
| | No.1 | No.2 | No.3 | No.4 | No.5 | |
| Melt temperature | 225 | 225 | 225 | 225 | 225 | ℃ |
| Mold temperature | 50 | 50 | 50 | 40 | 40 | ℃ |
| Injection speed | 25 | 20 | 45 | 40 | 30 | mm/s (screw diameter 25 mm) |
| Packing pressure | 220 | 200 | 200 | 290 | 225 | bar |
| Packing time | 3.00 | 1.00 | 2.00 | 3.00 | 4.00 | sec |
| Cooling time | 15.00 | 25.00 | 30.00 | 30.00 | 35.00 | sec |

SYSTEM AND METHOD FOR MONITORING INJECTION MOLDING PROCESS

CROSS-REFERENCE TO RELATED APPLICATION(S)

The present application is a U.S. National Phase entry from International Application No. PCT/KR2022/000272, filed Jan. 7, 2022, which claims priority to Korean Patent Application No. 10-2021-0119282, filed Sep. 7, 2021, the disclosure of which is incorporated by reference herein in their entirety.

TECHNICAL FIELD

The present disclosure relates to a system and method for monitoring an injection molding process which monitors the process by measuring a vibration signal of a mold and a temperature of a mold surface during injection molding using an acceleration sensor, a temperature sensor, and a magnetic hole sensor, and in particular, to a system and method for monitoring an injection molding process which attaches the acceleration sensor to an injection mold and calculates an injection time and a packing time and a cooling time by measuring an amplitude change of the vibration signal of the mold during injection molding, and senses mold closing and opening signals using a magnetic hall sensor and measures and analyses a cycle time.

BACKGROUND ART

A plastic injection molding process of the present disclosure has the advantage of having shorter production time and easier mass production as compared to other manufacturing processes, and the present disclosure monitors the process of heating a plastic to a temperature above its melting point and injecting it into a shape in a mold at high speed and pressure.

However, as the shape of molded products becomes complicated and the demand for high-precision products increases, the aforementioned advantages may act as disadvantages. In terms of the properties of the process, process variables such as a melting temperature, a mold temperature, an injection speed, and a packing(holding) pressure may act as important factors determining the quality of the product, and accordingly, it is greatly important to uniformly produce quality products by monitoring factors related to the variables.

Representatively, methods for monitoring behavior by measuring the pressure or temperature of a molten resin filled into a mold during injection molding are being researched.

The methods have the advantage of obtaining accurate process information because the information of the molten resin filled into the mold is directly measured through the sensor, while measurement sensors and systems need be able to withstand a high temperature and high pressure of the molten resin. In addition, because additional structures need to be design to install sensors in the complex mold and the miniaturization of the sensor need to be implemented, there is a problem that the introduction cost of monitoring technology is high, so there are many difficulties in applying it to industrial sites.

As an alternative method, a method of monitoring a process and product quality by measuring the number and cycle time of the entire production product by obtaining mold closing and mold opening signals using shot counters is used in industrial sites In the case of such a method, there is no structural restriction by attaching or detaching a device to or from a mold surface, the costs thereof are reduced, while there may be a problem in that accurate process information may not be obtained due to the lack of information for evaluating the injection molding process and product quality because only the mold closing signal and the mold opening signal are measured.

In addition, a plurality of production bases may be established in a plurality of countries in order to always supply parts or products of various shapes and sizes in uniform quality on time, and it is greatly important to efficiently manage the quality and production volume of products supplied by each production base.

In the case of establishing production bases in the plurality of countries, in order to reduce production costs, injection speed at which a resin is injected into the mold may be higher than the set speed, or a temperature change of the mold may be applied differently from a set value, or different set rules and values such as injecting into multiple molds through one resin inlet may be modified and applied. Accordingly, there may be a problem in that the uniformity and quality of the product may be reduced and the reliability and durability of the product may be reduced.

The present disclosure relates to a system and method for efficiently managing the quality and production volume of an injection-molded product, which can be easily applied to an existing or new mold in order to efficiently solve the above-described various problems.

PRIOR ART DOCUMENT (Patent Document 0001) Korean Patent No. 10-2266747
(Patent Document 0002) Korean Patent No. 10-1183283

SUMMARY OF THE INVENTION

In order to solve the problems of the prior technology, an aspect of the present disclosure is to provide a system for monitoring an injection molding process by attaching a sensor module equipped with an acceleration sensor configured to sense a change in an amplitude of a vibration signal of a mold and a temperature sensor configured to measure the temperature of a mold surface.

An aspect of the present disclosure is to provide a system and method for monitoring an injection molding process which can measure a vibration signal generated during the transition of each process step in the injection molding process, and can analyze a time interval between signals in which the amplitude change occurs, using a change in the amplitude included in the vibration signal over time.

An aspect of the present disclosure is to provide a system and method for monitoring an injection molding process which can provide convenience and low costs by installing a temperature sensor in a sensor module together in order to measure the temperature change of the mold surface, and can improve the conventional lack of process information to monitor the injection molding process more accurately.

An aspect of the present disclosure is to provide a system and method for monitoring an injection molding process in which a transfer medium between a sensor and a mold surface may be made of the same metal material as a mold such that an acceleration sensor and a temperature sensor may accurately receive information of an actual mold, and the system may be firmly fastened and fixed with bolts to minimize distortion and attenuation of a vibration signal.

An aspect of the present disclosure is to provide a system and method for monitoring an injection molding process which can acquire the time at which an amplitude change generates from an amplitude change of a vibration signal sensed by an acceleration sensor of a sensor module, measure the time of an 'injection start', 'V/P switchover,' and 'packing end,' and calculate and apply process monitoring information.

According to an aspect of the present disclosure, a system for monitoring an injection molding process may include: a sensor module installed on one side of a mold and configured to measure a vibration signal generated by the mold during injection molding; and a controller configured to receive the vibration signal of the mold measured by the sensor module and control a sensor of the sensor module, and a signal of which the amplitude is greater than or equal to a set value may be obtained from the vibration signal measured by the sensor module, and a time between the obtained signals may be calculated to monitor the injection molding process.

According to another aspect of the present disclosure, the sensor module may include: an acceleration sensor or vibration sensor configured to measure the vibration signal of the mold; and a temperature sensor and a magnetic hall sensor configured to measure a surface temperature of the mold.

According to another aspect of the present disclosure, in order to monitor the injection molding process, a signal may be detected by dividing a section of the vibration signal of the mold into an injection start section, V/P switchover (packing start) section, and packing end section, and the detected signal may be transmitted to the controller.

According to another aspect of the present disclosure, in order to monitor the injection molding process, each of data in the 'injection start' section, the 'V/P switchover' section and the 'packing end' section may define a median value in each section as a representative value, and a difference between an injection start time and a V/P switchover(packing start) time may be defined as an injection time, and a difference between a 'packing end' time and a 'V/P switchover(packing start)' time may be defined as a 'packing time'.

According to another aspect of the present disclosure, in order to increase accuracy and reliability of monitoring of the injection molding process, a configuration of monitoring a temperature change of the mold during the injection molding process may be added using the temperature sensor embedded in the sensor module.

According to another aspect of the present disclosure, in order to monitor the injection molding process, the magnetic hall sensor may sense a mold closing signal and a mold opening signal, the time of mold closing may be recorded in a sensor module controller using the sensed mold closing signal, and product production cycle times may be compared and analyzed using a difference in the time of closing the mold in each process.

According to another aspect of the present disclosure, a transfer medium between the sensor and a mold surface may be made of the same material as the mold such that the acceleration sensor and the temperature sensor of the sensor module can accurately detect vibration and temperature information of the mold without distortion.

According to another aspect of the present disclosure, a magnet may be installed on a movable mold surface, and when the installed magnet approaches a magnetic hall sensor installed on a fixed mold surface and is closed, the magnetic hall sensor may sense a '1' signal with the meaning of 'ON', and when the installed magnet moves away from the magnetic hall sensor and is opened, the magnetic hall sensor may sense a '0' signal with the meaning of 'OFF' and transmits the signal to the controller of the system.

According to another aspect of the present disclosure, for faster data processing, the signals obtained from the magnetic hall sensor, the acceleration sensor, and the temperature sensor may be arranged and processed according to predetermined rules so as to monitor the injection molding process quickly and accurately.

According to another aspect of the present disclosure, the controller may include a wireless communication unit including Bluetooth so as to transmit the signals obtained from the magnetic hall sensor, the acceleration sensor and the temperature sensor to at least one of a computer, a server, and a smartphone.

According to another aspect of the present disclosure, the sensor module may be installed on a fixed mold base of the mold so as to accurately measure the pressure of a molten resin and the vibration signal by screw operation during injection molding to prevent attenuation of the vibration signal generated during the molding process.

According to an aspect of the present disclosure, a method for monitoring an injection molding process may include: installing a sensor module on one side of a mold, and measuring a vibration signal generated by the mold during injection molding; and obtaining a signal of which the amplitude is greater than or equal to a set value from the vibration signal of the mold measured by the sensor module, and calculating the time between the acquired signals.

According to another aspect of the present disclosure, the method for monitoring an injection molding process may further include: measuring the vibration signal measured by an acceleration sensor or a vibration sensor configured to measure the vibration signal of the mold embedded in the sensor module, and a surface temperature of the mold with a temperature sensor embedded in the sensor module.

According to another aspect of the present disclosure, the method for monitoring an injection molding process may further include: detecting a signal by dividing a section of the vibration signal of the mold into the 'injection start' section, the 'V/P switchover (packing start)' section and the 'packing end' section; and transmitting the detected signal to the controller, in order to monitor the injection molding process.

According to another aspect of the present disclosure, the method for monitoring an injection molding process may further include: defining a median value in each section as a representative value by each of data in the 'injection start' section, the 'V/P switchover(packing start)' section and the 'packing end' section; and defining a difference between an 'injection start' time and a 'V/P switchover' time as an 'injection time', and defining a difference between a 'packing end' time and the 'V/P switchover' time as a 'packing time'.

According to another aspect of the present disclosure, the method for monitoring an injection molding process may further include: monitoring a temperature change of the mold during the injection molding process using the temperature sensor embedded in the sensor module in order to increase accuracy and reliability of monitoring of the injection molding process so as to increase accuracy and reliability of monitoring of the injection molding process.

According to another aspect of the present disclosure, the method for monitoring an injection molding process may further include: sensing a mold closing signal and a mold opening signal by the magnetic hall sensor; recording the time of mold closing in a sensor module controller using the sensed mold closing signal; and calculating and comparing product production cycle times using a difference in the time of closing the mold in each process.

According to another aspect of the present disclosure, the method for monitoring an injection molding process may further include: making a transfer medium between the sensor and a mold surface of the same material as the mold such that the acceleration sensor and the temperature sensor of the sensor module can accurately detect vibration and temperature information of the mold without distortion.

According to an example embodiment of the present disclosure, a sensor module equipped with an acceleration sensor and a temperature sensor for measuring the temperature of a mold surface may be attached to one side of an existing mold or a newly installed mold to sense a change in the amplitude of a vibration signal of the mold, and uniformity and reliability of production product quality may be improved by sensing the temperature of the mold and monitoring an injection molding process.

According to another example embodiment of the present disclosure, a sensor module in which an acceleration sensor is mounted may be attached to one side of the mold, and in the injection molding process, a time interval between signals that cause amplitude changes may be analyzed using the change in the amplitude included in the vibration signal over time that occurs during the transition of each process step, and the injection molding process may be monitored, thereby reducing installation costs and facilitating maintenance of the injection molding process monitoring system including the sensor module.

According to another example embodiment of the present disclosure, a temperature sensor may be installed in a sensor module to measure a temperature change of a mold surface, thereby providing convenience and low cost, and the conventional lack of process information may be improved to more accurately monitor the state of the injection molding process.

According to another example embodiment of the present disclosure, a transfer medium between a sensor and a mold surface may be made of the same metal material as a mold, and by tightening and fixing the transfer medium with bolts, an acceleration sensor and a temperature sensor of the sensor module can accurately receive information on an actual mold, and distortion and attenuation of vibration signals may be minimized.

According to another example embodiment of the present disclosure, data at the time of an amplitude change may be obtained from an amplitude change that occurs over time in a vibration signal sensed by an acceleration sensor of a sensor module, and injection molding process monitoring information may be calculated and applied using an algorithm that measures a period between an 'injection start' time, a 'V/P switchover' time, and a 'packing end' time, thereby increasing the accuracy and reliability of the monitoring of the injection molding process.

BRIEF DESCRIPTION OF THE DRAWINGS

FIG. 3 illustrates specifications of the acceleration sensor module (i.e., an accelerometer MPU-6050 module).

FIG. 6 is a view illustrating specifications of a temperature sensor (i.e., DFR0024 module) adopted in the present disclosure.

FIG. 7 illustrates specifications of an arduino nano board in which an ATmega328 microchip adopted in the present disclosure is mounted.

FIG. 10 is an example in which a plurality of different molding conditions are applied to evaluate reliability and accuracy of monitoring data.

DETAILED DESCRIPTION

Details for implementing the present disclosure will be described below.

The present disclosure relates to a system and method for monitoring a injection molding process which may monitors the injection molding process by measuring a vibration signal of a mold and the temperature of a mold surface during injection molding using an acceleration sensor, a temperature sensor, and a magnetic hole sensor.

A detailed embodiment of the present disclosure will be described below.

A detailed embodiment of the present disclosure will be described based on the accompanying drawings.

Figure 1:
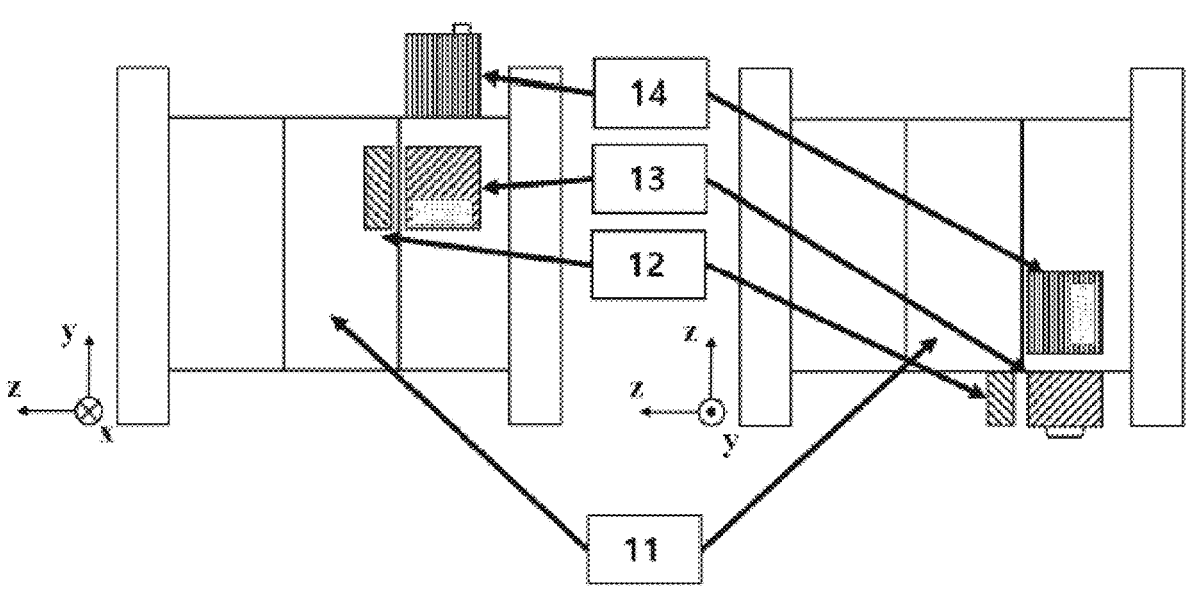
FIG. 1 is a view illustrating a state in which a sensor module having an acceleration sensor mounted therein, a magnet portion and a controller according to the present disclosure are attached to one side of a mold.

FIG. 1 is a view illustrating a state in which a sensor module having an acceleration sensor mounted therein, a magnet portion and a controller according to the present disclosure are attached to one side of a mold.

Figure 2:
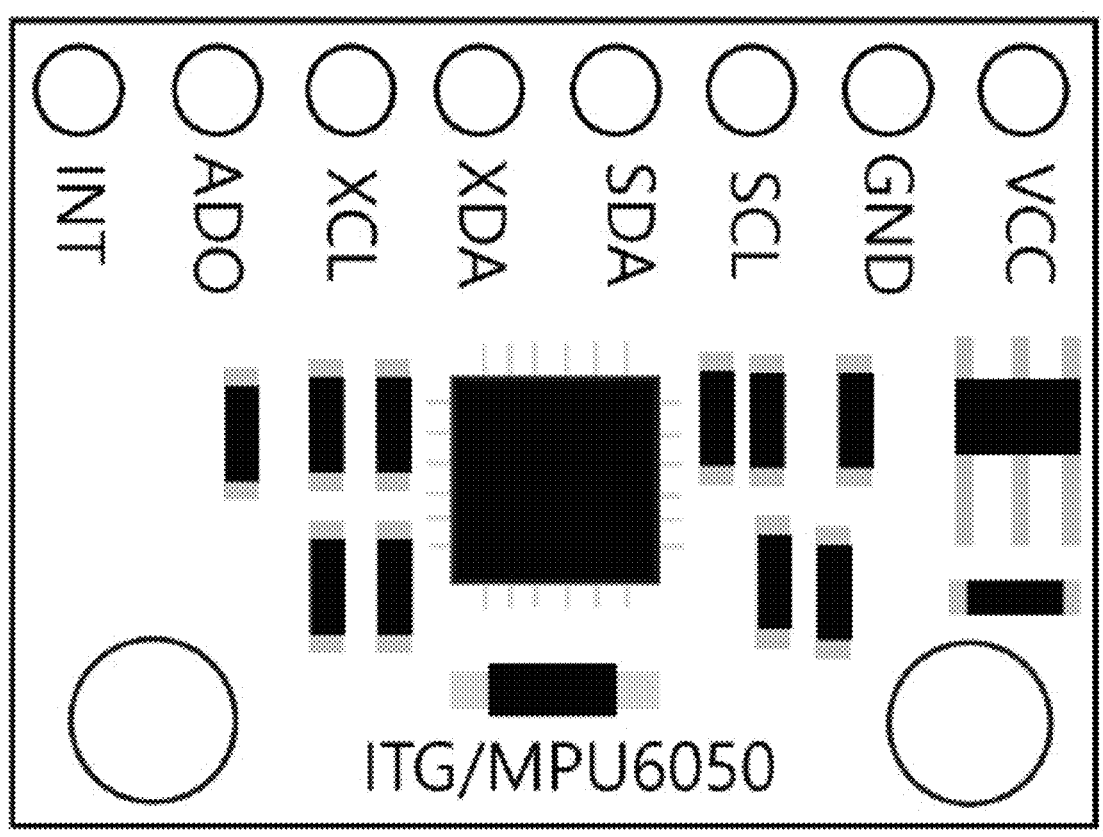
FIG. 2 illustrates an acceleration sensor module (i.e., an accelerometer MPU-6050 module) adopted for an embodiment of the present disclosure.

FIG. 2 illustrates an acceleration sensor module (i.e., an accelerometer MPU-6050 module) adopted for an embodiment of the present disclosure.

FIG. 3 illustrates specifications of the acceleration sensor module (i.e., an accelerometer MPU-6050 module).

The specification of the present disclosure, the 'acceleration sensor module (see FIG. 2)' refers to an acceleration sensor module (see FIG. 2, the accelerometer MPU-6050 module) adopted for implementation of the present disclosure, and the 'sensor module 13 (see FIG. 1)' refers to a sensor module equipped with an acceleration sensor or an acceleration sensor module, a temperature sensor, and a magnetic hole sensor.

In order to implement the present disclosure, pre-research and development of a system and method for monitoring an injection molding process using a vibration signal analysis of the mold according to process conditions during injection molding was conducted, and based on various studies, a change in the vibration signal of the mold using an acceleration sensor is analyzed with a signal for monitoring the injection molding process in the sensor module, thereby implementing the system and method for monitoring an injection molding process.

In order to implement the present disclosure, the acceleration sensor module (i.e., an accelerometer MPU-6050 module) has been adopted and applied. The acceleration sensor or acceleration sensor module may be selected to measure the time of an 'injection start', 'V/P switchover', and 'packing end' by detecting and obtaining an amplitude change of a vibration signal sensed by the acceleration sensor.

The acceleration sensor or the acceleration sensor module is sufficient as long as it may have excellent performance to detect the vibration signal of the mold during injection molding, and have faster reaction speed.

The present disclosure is described based on data (information) obtained based on the vibration signal obtained by attaching and installing the sensor module 13 (see FIG. 1) equipped with the acceleration sensor module (i.e., an accelerometer MPU-6050 module) with bolts as illustrated in FIG. 1.

The present disclosure is a system and method for monitoring an injection molding process by measuring the period between an 'injection start' time, a 'V/P switchover' time, and a 'packing end' time by obtaining the point at which an amplitude change occurs from the amplitude change that occurs over time in a vibration signal obtained by attaching and installing the sensor module 13 (see FIG. 1) equipped the acceleration sensor, the vibration sensor or the acceleration sensor module, to a mold, and such a technical configuration and method may belong to the protection scope of the present disclosure.

The sensor module equipped with the acceleration sensor module having the specification of FIG. 3 may be fixed to one side of the mold using a bolt as illustrated in FIG. 1, and monitoring elements may be selected by measuring the vibration signal of the mold during the injection molding process.

The sensor module 13 (see FIG. 1) equipped with the acceleration sensor or the acceleration sensor module may be attached to a surface of the mold as illustrated in FIG. 1 for convenience of installation, and may be installed on a fixed mold base of the mold so as to accurately measure the pressure of a molten resin during the injection molding and the vibration signal due to a screw operation.

When attaching and installing the sensor module to a movable mold base of the mold, since the vibration signal generated in an actual molding process may be attenuated or slightly measured due to vibration transmitted from a structure for applying mold force, the movable mold base may be excluded from a position in which the sensor module will be installed.

The acceleration sensor or acceleration sensor module for measuring the vibration of the mold described in the specification of the present disclosure may be replaced with a vibration sensor capable of measuring the vibration of the mold.

The acceleration sensor, the acceleration sensor module, or the sensor module may be connected to an arduino uno board to obtain the vibration signal of the mold during the injection molding.

The arduino uno board is a specific example, and an oscilloscope or a vibration signal measuring device similar thereto may be used, but the example is sufficient as long as it may be configured to measure the period between an 'injection start' time, a 'V/P switchover (packing start)' time, and a 'packing end' time in real time based on a sensed signal (i.e., the obtained signal).

Figure 4:
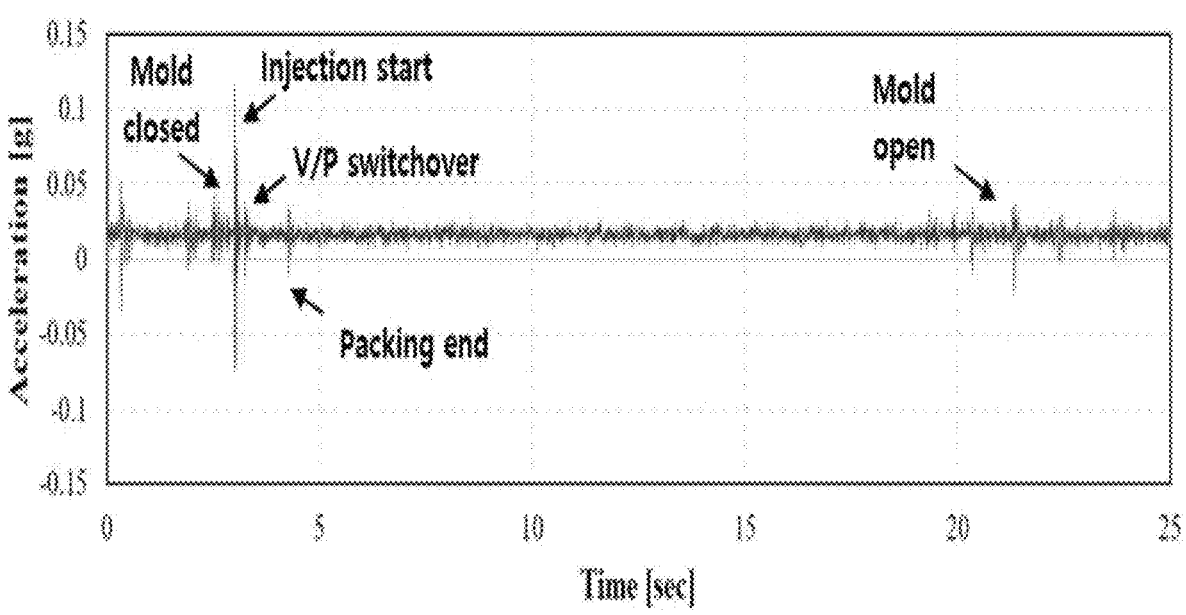
FIG. 4 is a view in which a vertical axis represents acceleration (g) as a amplitude (magnitude) of a vibration signal, a horizontal axis represents a time (sec) axis indicating the time during injection molding, and a measurement time is a vibration signal of the mold between 0 and 25 seconds.

More specifically, a 5-inch light guide plate mold may be used for a signal in FIG. 4, and a change in the vibration signal over time may be obtained while performing injection molding by injecting a polypropylene (HOPLENE J-150, LOTTE chemical) resin into the mold with a screw.

In the change in amplitude in the obtained vibration signal of FIG. 4, amplitude changes may be obtained at the time of mold closing, injection start, V/P switchover, packing end, and mold opening, and the signals at the time of the 'injection start', the 'V/P switchover', the 'packing end' may be used with such amplitude changes, thereby monitoring the injection molding process. In FIG. 4, the vibration signal of the mold is provided where the vertical axis represents acceleration (g) by the amplitude (magnitude) of the vibration signal, the horizontal axis represents the time (sec) for injection molding to proceed, and the measurement time is between 0 and 25 seconds.

Figure 5:
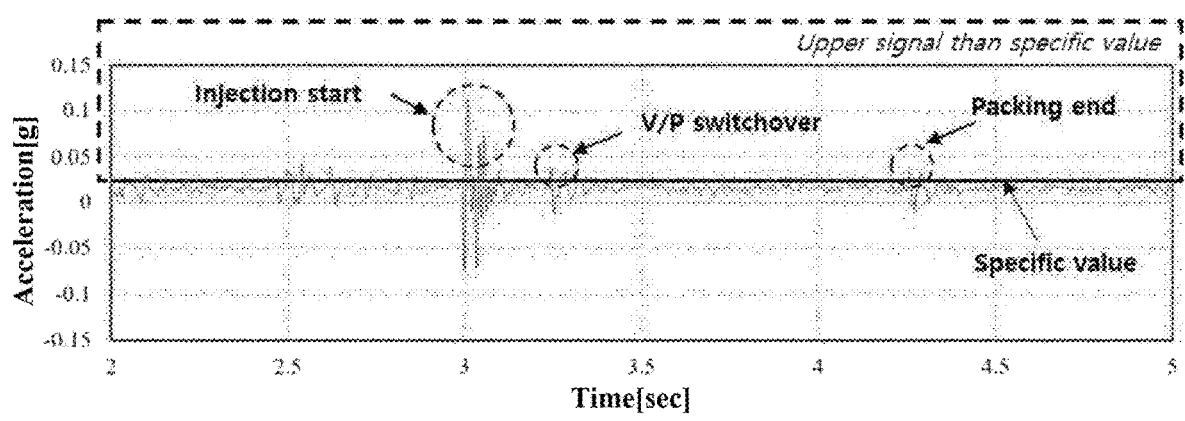
FIG. 5 is a view in which a vertical axis in the vibration signal of FIG. 4 is the same as that of FIG. 4, and the time (sec) axis indicating the time during which injection molding proceeds is expanded only to a vibration signal portion of the mold generated between 2 and 5 seconds.

FIG. 5 is a view in which a vertical axis in the vibration signal of FIG. 4 is the same as that of FIG. 4, and the time (sec) axis indicating the time during which injection molding proceeds is expanded only to a vibration signal portion of the mold generated between 2 and 5 seconds In FIG. 5, a main component of the system and method for monitoring an injection molding process of the present disclosure, which is the period between the 'injection start', the 'V/P switchover', the 'packing end' may be measured using the amplitude change of the vibration signal.

More specifically, in FIG. 5, an amplitude value larger than a specific value (blue in FIG. 5) in which the amplitude of the vibration signal is set may be detected, and the 'injection start' time, the 'V/P switchover(packing start)' time, the 'packing end' time may be measured and obtained by measuring the time between the respectively detected signals.

In FIG. 5, when using the magnitude of the amplitude of the vibration signal, an amplitude value larger than a specific value to a negative value (based on the absolute value) may be detected, and by measuring the time between the respectively detected signals, the 'injection start' time, the 'V/P switchover' time, the 'packing end' time may be measured and used in the same manner as the plus signal described above.

The calculation of information on the injection process through the vibration signal of the mold of the present disclosure will be described below.

The present disclosure is meant to calculate monitoring information of the injection molding process using a control algorithm installed in a control program of the present disclosure through the 'injection start' time, the 'V/P switchover' time, the 'packing end' time among the time when the amplitude change occurs in the vibration signal of the mold measured during injection molding.

A time difference between the 'injection start' time and the 'V/P switchover' time may be calculated to calculate an 'injection time' of the process, and a time difference between the 'packing end' time and the 'V/P switchover' time may be used to apply a means and method for calculating and obtaining a 'packing time' of the process to the sensor module.

Since the vibration signal of the entire mold is not required during injection molding in order to check the 'injection time' and the 'packing time', as illustrated in FIG.

5, a value (i.e., the specific value in FIG. 5) set to sense amplitude changes in the 'injection start' time, the 'V/P switchover' time, the 'packing end' time may be set, only signals larger than or equal to the specific value, and injection molding process information may be calculated using the signals, thereby providing a system and method for monitoring an injection molding process.

The measurement of the surface temperature of the mold of the present disclosure will be described below.

The sensor module includes the temperature sensor for measuring a surface temperature of the mold.

In the injection molding process, the temperature of the mold varies depending on the temperature of a coolant at a control device and the temperature of an injected molten resin, and externally, the temperature thereof also changes depending on the atmospheric temperature.

In consideration of the situation, the sensor module of the present disclosure may be equipped with the temperature sensor that can measure the temperature of the mold surface in addition to the vibration signal of the mold, and may be thus configured to monitor temperature conditions and changes in the injection molding process.

Considering the power consumption of the sensor module, the temperature sensor for measuring the temperature of the mold surface may be selected as a digital type in consideration of convenience in data transmission and reception. The temperature sensor may be selected and used in consideration of specifications among various temperature sensors.

In order to implement the present disclosure, the temperature sensor constitutes the sensor module by using a DFR0024 module. FIG. 6 is a view illustrating specifications of the temperature sensor (i.e., DFR0024 module).

The temperature sensor configured to measure the temperature of the mold surface is sufficient as long as it may withstand the temperature of the mold and monitor the temperature conditions and changes of the molding process in real time.

Next, the measurement of the mold closing and opening signal of the mold of the present disclosure will be described below.

A magnetic hall sensor having the specification of FIG. 7 may be selectively used such that the entire injection molding process time may be calculated in addition to the injection molding process information on the 'injection start', the 'V/P switchover' and 'packing end' obtained from the vibration signal analysis of the mold of the present disclosure, and may act as a trigger signal of the sensor module at the time of mold closure and mold opening.

The magnetic hole sensor for implementing the present disclosure is a DFR0033 module, and when the mold is closed and opened, the magnet mounted in a movable mold approaches the magnetic hole sensor mounted in the fixed mold, and it may be detected through a change in the magnetic field whether the magnet moves away from the magnetic hole sensor, thus identifying the time of closing or opening the mold.

A signal at the time of closing the mold obtained using the magnetic hall sensor acts as a trigger signal for process monitoring sensors to initiate related measurements thereof, and a signal at the time of opening the mold acts as a termination signal for sensors, thus measuring a process signal and recognizing that a single product is injection-molded.

In addition, a method of evaluating the overall cycle time of each process with a difference in a level beyond a reference (standard) time by using the time difference at the time of closing the mold measured in each process using the magnetic hall sensor may be applied to increase the accuracy of monitoring the process.

Next, the controller for measuring and controlling a vibration signal, a temperature, and a hall sensor signal according to the present disclosure will be described below.

For measurement of the vibration signal and the temperature detected by the sensor module, processing of the measured signals (data), and system control, an arduino nano board (by Interaction Design Institutelvera) equipped with ATmega328 microchip was used. FIG. 7 is a view illustrating specifications of the arduino nano board.

An entire process may be control by uploading a control program produced according to the present disclosure in the arduino nano board, each sensor may be connected to the arduino nano board, thus transmitting the measured signals to the controller and receiving commands to start or terminate a measurement.

In addition, Bluetooth 4.0 communication module may be used to transmit and manage process information transmitted to the arduino nano board to other monitorable devices including computers, servers, and smartphones.

The arduino nano board equipped with an ATmega328 microchip is a specific embodiment used for implementation of the present disclosure, and may be used by mounting a control program necessary for system control by selecting some chips from the chips provided with various one-chip microprocessors.

FIG. 7 is a view illustrating specifications of the arduino nano board provided with an ATmega328 microchip.

The process monitoring of the present disclosure will be described in detail.

The measurement of a monitoring signal of the injection molding process with the sensor module is configured to start based on a signal when the mold is closed.

When the magnet installed on a movable-side mold surface approaches the magnetic hole sensor on the stationary-side mold surface and the mold is closed, the sensor senses a '1' signal with the meaning of 'ON' and transmits the signal to the controller of the system.

The sensor module receiving the '1' signal transmits the '1' signal received from the acceleration sensor and the temperature sensor to the controller to start monitoring the injection molding process.

For acceleration sensors embedded in the sensor module, only a vibration signal with amplitude larger than or equal to the set value may be detected to obtain only an amplitude change signal at the time of the 'injection start', the 'V/P switchover' and 'packing end' required for evaluation of the injection molding process information, and may be transmitted to the controller.

The acceleration sensor may be configured to measure a surface temperature signal of the mold while measuring the vibration signal so as to transmit the measured surface temperature signal to the controller.

The monitoring accuracy of the injection molding process may be improved by configuring a control program to measure the vibration signal with the acceleration sensor and simultaneously measure the surface temperature signal of the mold.

After the injection molding process is completed, when the mold is opened, the magnetic hall sensor transmits a '0' signal, which means 'OFF', to the controller, and terminates monitoring the entire process of the sensor module for one injection molding product.

The present disclosure is configured to continuously perform and monitor the measurement of the vibration signal, the temperature, and the magnetic field signal sensed by the magnetic hall sensor in real time as described above.

Figure 8:
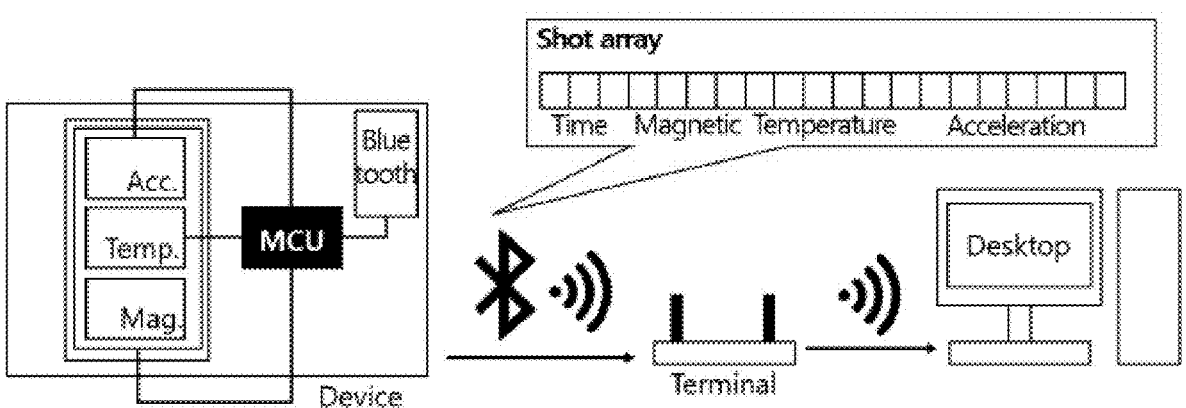
FIG. 8 is a view schematically illustrating a communication method between a sensor module and a monitoring device.

FIG. 8 is a view schematically illustrating a communication method between the sensor module and a monitoring device.

In other words, the present disclosure may implement a system configured to monitor and manage the injection molding processes of numerous molds when transmitting the vibration signal of the mold measured by the acceleration sensor, the temperature of the mold measured by the temperature sensor, and the magnetic field signal sensed by the hall sensor through wireless communication.

The process monitoring signals measured between the closing of the mold and the opening of the mold may be input to a system controller in the form of an arrangement, and when the mold is opened, the process monitoring signals may be transmitted to other devices such as a monitoring computer, a server, or a smartphone through wireless communication.

In the present disclosure, by applying a Bluetooth communication method, the vibration signal measured by the sensor module, the temperature, and the magnetic field signal sensed by the hall sensor may be transmitted to monitorable systems, including computers, servers, and smartphones, but various modifications may be made to the method of processing such signals.

The vibration signal measured by the sensor module, the temperature, and the magnetic field signal sensed by the hall sensor may be transmitted to a system or device for managing and controlling the monitoring of the injection molding process using normal wireless or wired communication.

The configuration of the system for monitoring an injection molding process according to the present disclosure will be described below.

The system for monitoring an injection molding process according to the present disclosure may include four portions: a magnet portion, a sensor module, a controller, and a monitoring unit, and the magnet portion may be installed in the movable mold base surface of the mold, and the sensor module and the controller may be installed in the fixed mold base surface.

The magnet portion and the sensor module according to the present disclosure may be fixedly installed to interlock with each other, the magnetic hall sensor embedded in the sensor module may interlock with the magnet portion to generate a signal suitable for a closing or opening movement of the mold, and the acceleration sensor and the temperature sensor in the sensor module may be fixedly installed on one side of the mold so that the acceleration sensor and the temperature sensor may sense the vibration signal and the temperature by the generated signal.

As an embodiment of the present disclosure, the magnet portion may be installed on the movable mold base surface of the mold and may be configured to fix a magnet capable of interacting with the magnetic hall sensor embedded in the sensor module. The magnet portion and the surface of the mold may be configured to be fixed with bolts.

The sensor module may be installed on the fixed mold base surface of the mold to interact with the magnet portion on the movable mold base surface, and may be equipped with the acceleration sensor, the temperature sensor, and the magnetic hole sensor to measure and monitor the injection molding process information.

When portions of the sensor module to which each of the sensors is fixed is made of plastic, there may be a problem in that that the vibration signal transmitted from the mold and the surface temperature of the mold may not be accurately measured.

The vibration signal of the mold is attenuated or absorbed by plastic and transmitted to the sensor, and the temperature of the mold surface is not measured by the sensor due to the difference in thermal conductivity between the metal and plastic, which are the materials of the mold.

In view of such a problem, a transfer medium between the sensor and the mold surface may be made of the same material as the mold together with a metal cover and fastened with bolts to minimize signal distortion such that the acceleration sensor and the temperature sensor embedded in the sensor module may accurately receive vibration and temperature information of the actual mold.

When installing the sensor module on one side of the mold, the sensor module may be fastened with attachment means such as a plurality of bolts such that the vibration signal of the mold may be transmitted to the acceleration sensor without distortion, but the attachment means is sufficient as long as it may allow the acceleration sensor to sense the vibration signal of the mold without distortion.

In addition, a gap may be configured to come into contact with only a bolt engagement portion between the metal cover and a plastic casing to minimize attenuation or distortion of signal caused by contact between the plastic case and the metal cover, and the gap may be applied to the plastic case such that the gap is reflected to the contact between the sensor module and the surface of the mold to bring only the metal cover into contact with the mold.

The system controller of the present disclosure will be described below.

The system controller of the present disclosure is installed on the fixed mold base surface of the mold and is connected to a measurement unit by a cable to receive mutual measurement signals and control signals. The arduino nano board is installed inside the controller to receive a transmission signal from the measurement unit and analyze and control the entire monitoring process.

In order to monitor the injection molding process required for implementing the system according to the present disclosure, a Bluetooth 4.0 module may be mounted inside the controller, and the measured injection molding process signal may be transmitted directly or through a repeater to external monitoring devices such as computers, servers, and smartphones.

In addition, a 9V battery may be configured to be mounted in the controller in consideration of the convenience of installation and measurement.

The controller 14 (see FIG. 1) and the sensor module 13 (see FIG. 1) may be configured to receive mutual signals using a D-SUB 9-pin cable.

The controller 14 (see FIG. 1) and the sensor module 13 (see FIG. 1) may be configured to be integrally embedded in the same box.

Such a configuration is a specific embodiment, and modification and design may be configured by selecting and using components adopted in the implementation of the present invention and alternative products equal to or excellent in performance and specifications, and such modification also falls within the scope of protection of the present disclosure.

As a specific embodiment adopted when implementing the present disclosure, the sensor module may be controlled by mounting a control program designed for performing the present disclosure in the arduino nano board.

In order to obtain the '1' signal of the magnetic hall sensor when the mold is closed, the program may be executed using a 'while (i.e., terminology used in a source program)' classification, and the corresponding time may be recorded after the '1' signal is measured.

The control program mounted in the controller may be configured to record the value and time of a molded vibration signal in which the amplitude of the vibration signal measured by the acceleration sensor is larger than or equal to a set value.

At the same time, the temperature sensor in the sensor module may be configured to measure the temperature of the mold surface, and arrange and store the temperature in chronological order.

When the mold is opened by completing an injection molding product, the control program may be configured such that the magnetic hole sensor may measure the '0' signal, and the injection molding process signal stored in the controller may be transmitted to at least one of the devices such as computers, servers, laptops, and smartphones through a Bluetooth module.

A monitored data analysis of the injection molding process described above will be described.

Figure 9:
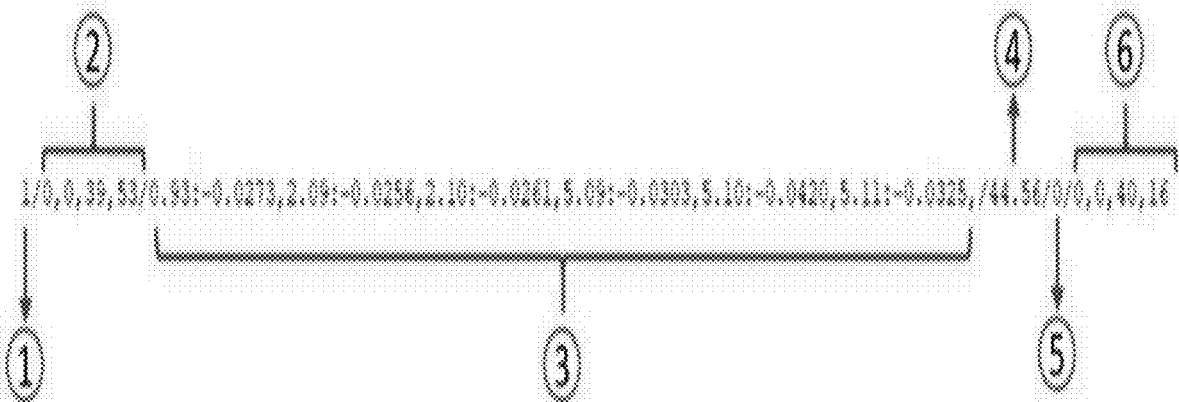
FIG. 9 is a view illustrating an arrangement of data capable of analyzing and evaluating an injection molding process obtained from a magnet portion, an acceleration sensor, and a temperature sensor manufactured according to the present disclosure.

A signal may be detected using the sensor module described above, and the detected signal may be transmitted to the controller, thus performing data analysis, and data may be obtained to analyze and evaluate the injection molding process as a specific example as illustrated in FIG. 9.

FIG. 9 is a view illustrating an arrangement of data capable of analyzing and evaluating an injection molding process obtained from the magnet portion, the sensor module, and the temperature sensor manufactured according to the present disclosure.

More specifically, in the data arrangement listed in FIG. 9, item 1 is a mold closing signal and is marked as '1', and the item 1 indicates the start of monitoring of the sensor module.

Item 2 indicates the time when the mold is closed.

The total cycle time may be evaluated using the mold closing time in the item 2, and the difference in the mold closing time in each shot (process) is defined as cycle time.

Item 3 is an acceleration signal, where acceleration values larger than or equal to a set value are measured, and the time during measurement is also recorded.

The acceleration signal in item 3 is divided into three categories: 'injection start,' 'V/P switchover (packing start),' and 'packing end,' and the time at the corresponding point is calculated(evaluated) by median values in each signal.

The injection time and packing end time may be evaluated by the difference between the median values in each signal.

Item 4 is a surface temperature item of the mold, and the surface temperature of the mold at that time is displayed.

Item 5 is marked with '0' as the mold opening signal, and the time of opening the mold is recorded in item 6.

The data arrangement listed in FIG. 9 has a predetermined rule (see FIG. 9), and the controller may be programmed to process measurement data, and may be configured to monitor the injection molding process quickly and accurately.

Figure 11:
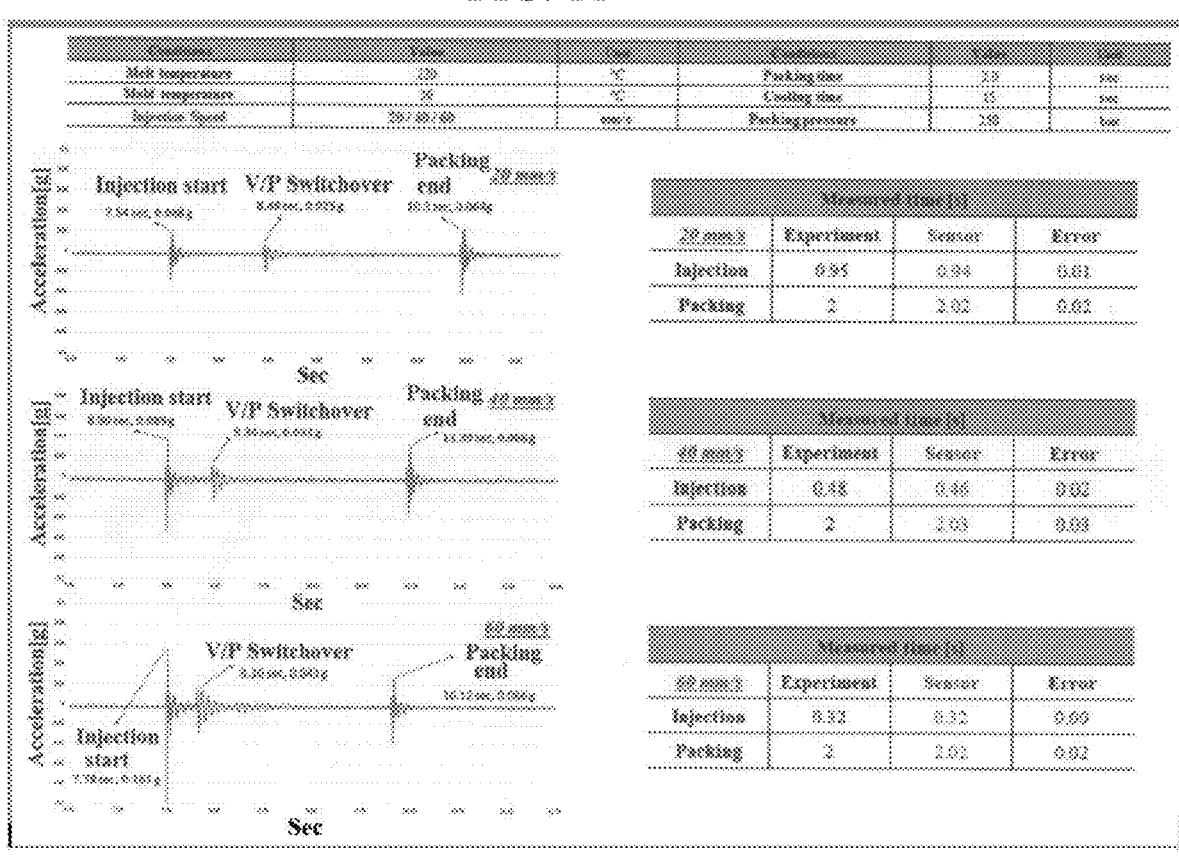
FIG. 11 is a view illustrating a vibration signal obtained by measuring a change in an injection start, a V/P switchover, and a packing end time (sec) according to a change in an injection speed of a resin.

FIG. 11 is a view illustrating a vibration signal configured to measure the change in the injection start time (sec), the V/P switchover (packing start) time (sec), and the packing end time (sec) according to the change in injection speed when the resin is injected into the mold.

At this time, the resin injection speed is differently set to 20 mm/s, 40 mm/s, and 60 mm/s, respectively, through which changes in the injection start time (sec), the 'V/P switchover(packing start) time (sec), and the packing end time (sec) are measured. As a result of the measurement, it may be seen that the error occurs greatly small regardless of the change in the injection speed.

The sensor module for monitoring the injection molding process according to the present disclosure may measure and evaluate the cycle time, the injection time, the packing time, the mold surface temperature, and the cooling time through the aforementioned analysis means and methods.

A means and method for monitoring and evaluating the temperature change of the mold according to the present disclosure will be described.

After installing the sensor module to monitor the injection molding process of a 5-inch light guide plate mold described above, the process monitoring may be evaluated using a 150-ton high-speed injection molding machine (LGE150-III-DHS, LSMtron).

In order to monitor the temperature change of the mold, an injection molding machine may be driven by a dry cycle mode in which only the machine operates without actual injection molding, and after setting the temperature of the coolant of the heating device to 45° C., the process of increasing the temperature of the mold at room temperature may be monitored through the sensor module.

The signal measured by the sensor module is transmitted through Bluetooth of the controller to acquire and store data displayed on a desktop computer screen. The monitoring result of temperature change on the mold surface is graphically displayed on the desktop computer screen through a temperature gauge.

As a result of the experiments, it may be found that the temperature of the mold monitored by the sensor module increases to the temperature of the coolant set in the heating device, and as a result of direct measuring the temperature of the mold surface with a contact thermometer, it may be found that a value similar to a temperature monitored by the sensor module is measured.

In order to detect whether the attached sensor module has been removed by an operator or a manager, a proximity sensor that operates when it falls off the mold on one side of the sensor module or a contact sensor that detects the state of contact may be installed on one side or both sides of the sensor module. Both sides refer to a fixed mold base and a movable mold base.

An evaluation for the system and method for monitoring an injection molding process time monitoring according to the present disclosure will be described below.

In order to perform the monitoring and evaluation of the injection molding process time of the sensor module for monitoring the injection molding process, the injection molding under five conditions is performed by applying molding conditions of FIG. 10, and monitoring data of the sensor module and shot (process) data recorded on the injection molding machine are compared with each other.

FIG. 10 is an example in which a plurality of different molding conditions are applied to evaluate reliability and accuracy of the monitoring data. This is applied to the 5-inch light guide plate mold described above.

Each molding condition is a condition that implements different injection time, different packing time, different cooling time, and different cycle time, and accordingly, a system and method for monitoring an injection molding process using the sensor module of the present disclosure are evaluated.

As a result of comparing the monitoring data measured by the sensor module and shot (process) data on the injection molding machine, it may be found that in the cycle time item, condition 1 is 0.59±0.02% on average, condition 2 is 0.23±0.01% on average, condition 3 is 0.76±0.46% on average, condition 4 is 1.03±0.26% on average, and condition 5 is a 0.91±0.21% error on average, and a value similar to the cycle time measured in the actual injection molding machine is measured by the sensor module.

In the injection time items, each error of the conditions is 0.51±0.57%, 0.97±0.55%, 1.83±1.17%, 2.03±1.24%, and 1.65±1.32%, and generally, a small level of deviation is less than 5%.

This is also found in the packing time item, and shows a level similar to the packing time set to errors of 0.23±0.30%, 0.85±1.29%, 1.25±0.84%, 0.63±0.43%, and 0.48±0.39%, respectively.

Accordingly, in the present disclosure, it may be seen that the sensor module for monitoring the injection molding process may improve monitoring accuracy and reliability when monitoring the temperature change of the mold during the injection molding process and the monitoring data of the cycle time, the injection time, and the packing time are applied together to the injection molding process.

On the other hand, it may be seen that the cooling time provides a cooling time value having a constant level in the same process, which may be used as an index to detect and evaluate changes in the process.

As described above, the present disclosure provides a system and method for monitoring an injection molding process by measuring the vibration signal of the mold and the temperature of the mold surface during injection molding using the sensor module for monitoring the injection molding process.

The sensor module is provided in a structure that may be attached and installed on existing or new mold surfaces. The present disclosure provides a system and method for monitoring an injection molding process by installing the acceleration sensor, the temperature sensor, and the magnetic hall sensor in the sensor module.

The vibration signal of the mold during injection molding may be measured using the acceleration sensor to obtain the injection time and packing time, the mold closing and opening signals of the mold may be detected using magnetic hall sensors. The cycle time and cooling time may be measured and be compared with the shot (process) data recorded on the injection molding machine to monitor the injection molding process, thus increasing accuracy and reliability.

As a result of implementing the monitoring system according to the present disclosure, the vibration signals of the mold measured through the sensor module for monitoring the injection molding process may be divided into the 'injection start' section, the 'V/P switchover(packing start)' section, and the 'packing end' section, and the median value of the corresponding section is set to the representative time (a representative data value), and the difference between the 'V/P switchover(packing start)' time and the 'injection start' time is defined as 'injection time' and the difference between the 'packing end' time and the 'V/P switchover(packing start)' time is defined as 'injection time,' which are used to monitor the injection molding process.

Each of the 'injection time' and 'packing time' defined according to the present disclosure may be compared with the time recorded in the actual injection molding machine, and the accuracy of the injection molding process may be determined by the error of % in the time according to the comparison.

As compared to the time recorded in the actual injection molding machine to which the present disclosure is applied, the 'injection time' has an error of 1.40±1.17%, and the 'packing time' has an error of 0.69±0.82%, and these figures may show that the process time may be monitored very accurately.

By using the mold closing signal measured by the magnetic hall sensor, the mold closing time is transmitted to and recorded in the controller disclosed adjacent to the sensor module and the cycle time is evaluated using the difference between the mold closing time points in each process.

As a result of comparing the cycle time monitored by the sensor module with the cycle time on the actual injection molding machine, a very small error of 0.70±0.38% may be required which may obtain the cycle time similar to the actual cycle time.

On the other hand, for the cooling time calculated using the cycle time, the injection time, and the packing time measured by the sensor module, this may be compared to the cooling time set on the actual injection molding machine, and as a result of the comparison, there is an error of 7.05±1.99%, and this value is far larger than other process times.

However, since it could be confirmed that the deviation was a mechanical deviation according to the operation of the injection molding machine and the measurement method of the sensor module and thus showed a certain level of the same value in the same process, the deviation may be used as an indicator to detect and evaluate changes in the process.

The sensor module for monitoring the injection molding process according to the present disclosure may accurately monitor the process time for each step and the temperature of the mold for the injection molding process, a system and method for more efficient and accurate process management and product quality management may be provided as compared to traditional monitoring methods.

In addition, since a method of an attachment to the surface by bolts or various fastening means without additional structural processing to the mold is provided, excellent installation convenience may be provided where components can be attached to existing or new molds, and since the acceleration sensor, the temperature sensor, and the magnetic hall sensor are applied at low costs, the costs for implementing systems may be reduced.

As mentioned above, the present disclosure provides the system and method for monitoring an injection molding process that may include the sensor module, the magnet portion, and the controller, which are connected to an external monitoring system through Bluetooth communication.

The major technical configuration is to provide the system and method for accurately monitoring whether the injection molding process is performed well by dividing the vibration signal of the mold measured through the sensor module into the 'injection start' section, the 'V/P switchover (packing start)' section, and the 'packing end' section and comparing and analyzing each occurrence time with each other.

The sensor embedded in the sensor module and configured to detect the vibration of the mold may be used by selecting the acceleration sensor or the vibration sensor that may detect the vibration of the mold, and a communication means communicating with the controller may also include conventional wireless or wired communication including Bluetooth.

As illustrated in FIG. 1, the sensor module (including the acceleration sensor, the temperature sensor, and the hall sensor) and the magnet portion according to the present disclosure may be attached to one side of the mold, and the signal generated during the injection molding process may be detected, and as illustrated in FIG. 8, the signal may be transmitted, through the controller, to a computer, a server, a smartphone, or the like to accurately monitor whether the injection molding process is selectively well performed.

Based on the aforementioned description, the protection scope of the system for monitoring an injection molding process configured to monitor the injection molding process according to the present disclosure will be described below.

According to an embodiment of the present disclosure, a system for monitoring an injection molding process includes: a sensor module installed on one side of a mold and configured to measure a vibration signal generated by the mold during injection molding; and a controller configured to receive the vibration signal of the mold measured by the sensor module and control a sensor of the sensor module, and a signal of which the amplitude is greater than or equal to a set value is obtained from the vibration signal measured by the sensor module, and a time between the obtained signals is calculated to monitor the injection molding process.

According to another embodiment of the present disclosure, the sensor module includes: an acceleration sensor or vibration sensor configured to measure the vibration signal of the mold; and a temperature sensor and a magnetic hall sensor configured to measure a surface temperature of the mold.

According to another embodiment of the present disclosure, in order to monitor the injection molding process, a signal is detected by dividing a section of the vibration signal of the mold into an injection start section, a V/P switchover (packing start) section and a packing end section, and the detected signal is transmitted to the controller.

According to another embodiment of the present disclosure, each of data in the injection start section, the V/P switchover(packing start) section and the packing end section defines a median value in each section as a representative value, and a difference between an injection start time and a V/P switchover time is defined as an injection time, and a difference between a packing end time and the V/P switchover time is defined as a packing time, thereby monitoring the injection molding process.

According to another embodiment of the present disclosure, in order to increase accuracy and reliability of monitoring of the injection molding process, a configuration of monitoring a temperature change of the mold during the injection molding process is added using the temperature sensor embedded in the sensor module.

According to another embodiment of the present disclosure, the magnetic hall sensor senses a mold closing signal and a mold opening signal, the time of mold closing is recorded in a sensor module controller using the sensed mold closing signal, and product production cycle times are compared and analyzed using a difference in the time of closing the mold in each process, thereby monitoring the injection molding process.

According to another embodiment of the present disclosure, a transfer medium between the sensor and a mold surface is made of the same material as the mold such that the acceleration sensor and the temperature sensor of the sensor module can accurately receive vibration and temperature information of the mold without distortion.

According to another embodiment of the present disclosure, a magnet is installed on a movable mold surface, and when the installed magnet approaches a magnetic hall sensor installed on a fixed mold surface and is closed, the hall sensor senses a '1' signal with the meaning of 'ON,' and when the installed magnet moves away from the magnetic hall sensor and is opened, the magnetic hall sensor senses a '0' signal with the meaning of 'OFF' and transmits the signal to the controller of the system.

According to another embodiment of the present disclosure, for faster data processing, the signals obtained from the magnetic hall sensor, the acceleration sensor, and the temperature sensor are arranged and processed according to predetermined rules so as to monitor the injection molding process quickly and accurately.

According to another embodiment of the present disclosure, the controller includes a wireless communication unit including Bluetooth so as to transmit the signals obtained from the magnetic hall sensor, the acceleration sensor and the temperature sensor to at least one of a computer, a server, and a smartphone.

According to another embodiment of the present disclosure, the sensor module is installed on a fixed mold base of the mold so as to accurately measure the pressure of a molten resin and the vibration signal by screw operation during injection molding to prevent attenuation of the vibration signal generated during the molding process.

According to another embodiment of the present disclosure, when the sensor module falls off the mold, an operating proximity sensor or a contact sensor configured to sense a state of contact is installed on one or opposite sides of the sensor module.

The protection scope of the method for monitoring an injection molding process configured to monitor the injection molding process according to the present disclosure will be described below.

According to an embodiment of the present disclosure, a method for monitoring an injection molding process includes: installing a sensor module on one side of a mold, and measuring a vibration signal generated by the mold during injection molding; and obtaining a signal of which the amplitude is greater than or equal to a set value from the vibration signal of the mold measured by the sensor module, and calculating the time between the acquired signals.

According to another embodiment of the present disclosure, the method for monitoring an injection molding process further includes: measuring the vibration signal measured by an acceleration sensor or a vibration sensor configured to measure the vibration signal of the mold embedded in the sensor module, and a surface temperature of the mold with a temperature sensor embedded in the sensor module.

According to another embodiment of the present disclosure, the method for monitoring an injection molding process further includes: detecting a signal by dividing a section of the vibration signal of the mold into an injection start section, a V/P switchover section and a packing end section, and transmitting the detected signal to the controller, in order to monitor the injection molding process.

According to another embodiment of the present disclosure, the method for monitoring an injection molding process further includes: defining a median value in each section as a representative value by each of data in the injection start section, the V/P switchover section and the packing end section; and defining a difference between an injection start time and a V/P switchover time as an injection time, and defining a difference between a packing end time and the V/P switchover time as a packing time.

According to another embodiment of the present disclosure, the method for monitoring an injection molding process further includes: monitoring a temperature change of the mold during the injection molding process using the temperature sensor embedded in the sensor module so as to increase accuracy and reliability of monitoring of the injection molding process.

According to another embodiment of the present disclosure, the method for monitoring an injection molding process further includes: sensing a mold closing signal and a mold opening signal by the magnetic hall sensor; recording the time of mold closing in a sensor module controller using the sensed mold closing signal; and calculating and comparing product production cycle times using a difference in the time of closing the mold in each process.

According to another embodiment of the present disclosure, the method for monitoring an injection molding process further includes: making a transfer medium between the sensor and a mold surface of the same material as the mold such that the acceleration sensor and the temperature sensor of the sensor module can accurately receive vibration and temperature information of the mold without distortion.

According to another embodiment of the present disclosure, the method for monitoring an injection molding process further includes: when a magnet installed on a movable-side mold surface approaches a magnetic hall sensor installed on a stationary-side mold surface and is closed, sensing a '1' signal with the meaning of 'ON' by the hall sensor; and when the installed magnet moves away from the magnetic hall sensor and is opened, sensing a '0' signal with the meaning of 'OFF' by the magnetic hall sensor and transmitting the signal to the controller of the system.

According to another embodiment of the present disclosure, the method for monitoring an injection molding process further includes: for faster data processing, arranging and processing the signals obtained from the magnetic hall sensor, the acceleration sensor, and the temperature sensor according to predetermined rules so as to monitor the injection molding process quickly and accurately.

According to another embodiment of the present disclosure, the controller comprises a wireless communication unit including Bluetooth, and the method for monitoring an injection molding process further includes: transmitting the signals obtained from the magnetic hall sensor, the acceleration sensor and the temperature sensor to at least one of a computer, a server, and a smartphone.

Based on the aforementioned description, the protection scope of the system and method for monitoring an injection molding process configured to monitor the injection molding process according to the present disclosure may be described in various ways.

INDUSTRIAL APPLICABILITY

The industrial applicability of the present disclosure is obvious in that the present disclosure provides a system and method for monitoring an injection molding process which may calculate injection time and packing time by attaching an acceleration sensor to an injection molding mold with bolts and measuring an amplitude change of a vibration signal of a mold during injection molding, detect mold closing and opening signals of the mold using a magnetic hall sensor, and monitor the injection molding process by measuring cycle time and cooling time, thereby simplifying installation and maintenance and reducing installation costs.

What is claimed is:

1. A system for monitoring an injection molding process, the system comprising:
  a sensor module fastened on one side of a mold by bolts and configured to measure a vibration signal generated by the mold during the injection molding process wherein the sensor module is coupled to the mold via a transfer medium made of a same material as the mold to minimize distortion and attenuation of the vibration signal; and
  a controller configured to receive the vibration signal of the mold measured by the sensor module and control the sensor module,
  wherein the controller is configured to obtain a signal of which the amplitude is greater than or equal to a set value from the vibration signal measured by the sensor module, and calculates a time between the obtained signals,
  wherein the vibration signal is divided into an injection start cycle time, a V/P switchover cycle time and a packing end cycle time,
  wherein, in order to monitor the injection molding process, the controller is configured to define for each of the cycle times a representative value based on a median value of the amplitude of the vibration signal within the cycle time, determine an injection time as a difference between an injection start time and a V/P switchover time, and determine a packing time as a difference between a packing end time and the V/P switchover time, compare the injection time and the packing time with actual cycle times recorded during the molding process, evaluate whether deviations between the calculated times and the machine-recorded times satisfy preset monitoring conditions, and output a monitoring result indicating a state of quality and reliability of the molding process,
  wherein the vibration signal detected in each of the cycle times is transmitted to the controller, and
  wherein the controller further analyzes the obtained signals according to a predetermined rule to determine the injection time, the packing time, and the cycle times of the injection molding process.

2. The system of claim 1, wherein the sensor module comprises:
  an acceleration sensor or vibration sensor configured to measure the vibration signal of the mold;
  a temperature sensor configured to measure a surface temperature of the mold; and
  a magnetic hall sensor configured to sense a mold closing signal and a mold opening signal.

3. The system of claim 2, wherein the median value of the amplitude of the vibration signal in each of the injection start cycle time, the V/P switchover cycle time and the packing end cycle time is defined as the representative value.

4. The system of claim 2, wherein a temperature change of the mold is monitored during the injection molding process using the temperature sensor embedded in the sensor module.

5. The system of claim 2,
  wherein a time when the mold is closed is recorded in the controller using the sensed mold closing signal, and
  wherein an overall cycle time of each of the injection molding process is compared and analyzed using a difference in the time of closing the mold.

6. The system of claim 5, wherein the signals obtained from the magnetic hall sensor, the acceleration sensor, and the temperature sensor are arranged and processed according to predetermined rules so as to monitor the injection molding process.

7. The system of claim 6, wherein the controller comprises a wireless communication unit including Bluetooth so as to transmit the signals obtained from the magnetic hall sensor, the acceleration sensor and the temperature sensor to at least one of a computer, a server, and a smartphone.

8. The system of claim 2, wherein the transfer medium positioned between the sensor module and a mold surface, the transfer medium being made of the same material as the mold such that the acceleration sensor and the temperature sensor of the sensor module can receive vibration and temperature information of the mold without distortion.

9. The system of claim 2, wherein a magnet is installed on a movable mold base, wherein when the installed magnet approaches the magnetic hall sensor installed on a fixed mold base and the mold is closed, the magnetic hall sensor senses a "1" signal with the meaning of "ON" and transmits the "1" signal to the controller, and wherein when the installed magnet moves away from the magnetic hall sensor and the mold is opened, the magnetic hall sensor senses a "0" signal with the meaning of "OFF" and transmits the "0" signal to the controller.

10. The system of claim 1, wherein the sensor module is installed on a fixed mold base of the mold so as to measure the vibration signal by a pressure of a molten resin and a screw operation during the injection molding process to prevent attenuation of the vibration signal generated during the injection molding process.

11. The system of claim 1, wherein the sensor module comprises an operating proximity sensor or a contact sensor installed on one side or two opposing sides of the sensor module to detect whether the sensor module falls off the mold.

* * * * *